INVENTORS
Hans H. Bottenberg, Hans Joachim Jestädt,
Hans G. Leysieffer & Felix Johan Stockinger

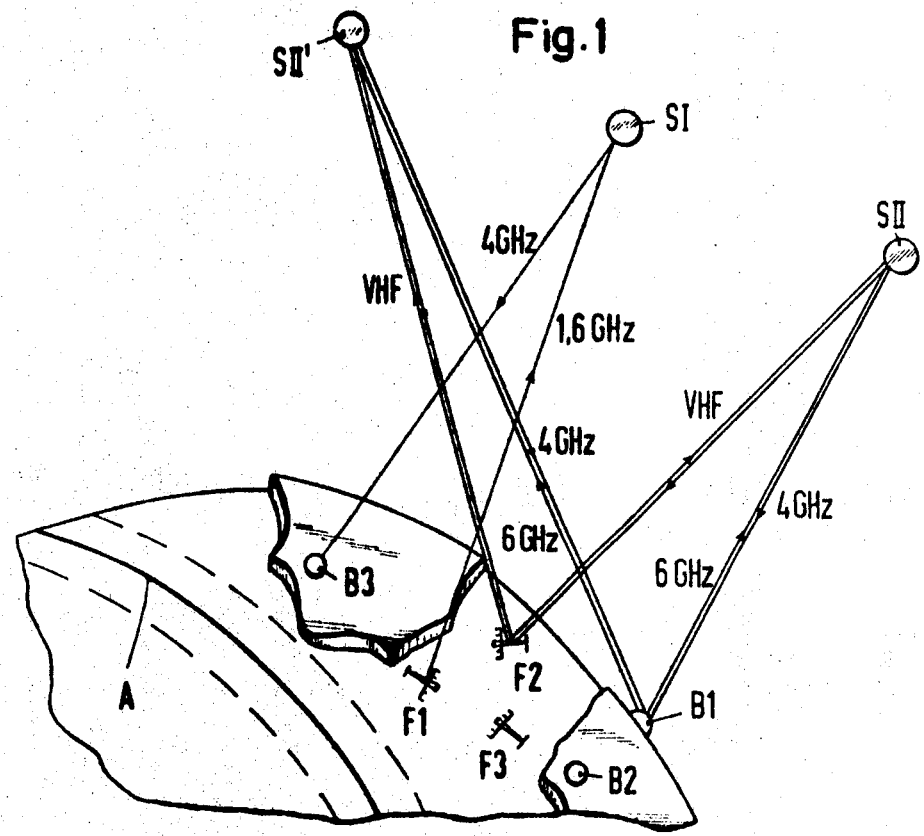
Fig. 1
Fig. 2a
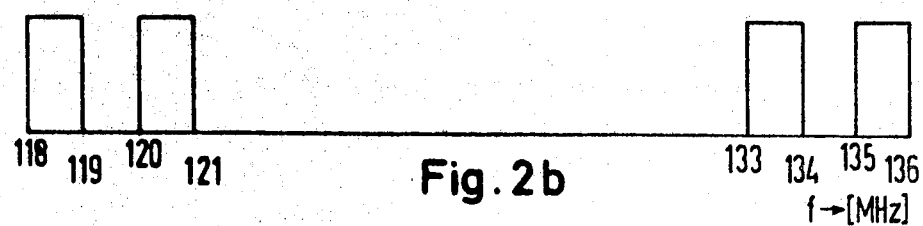
Fig. 2b
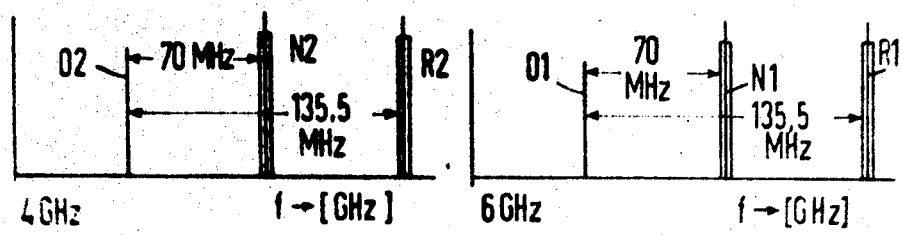
INVENTORS
Hans H. Bottenberg, Hans-Joachim Jesfädt,
Hans G. Leysieffer & Felix Johan Stockinger
ATTYS.

BY ATTYS.

Dec. 1, 1970   H. H. BOTTENBERG ET AL   3,544,995
NAVIGATION METHOD WITH THE AID OF SATELLITES
Filed July 15, 1968   5 Sheets-Sheet 3

INVENTORS
Hans H. Bottenberg, Hans Joachim Jostädt,
Hans G. Leysieffer & Felix Johan Stockinger

BY
ATTYS.

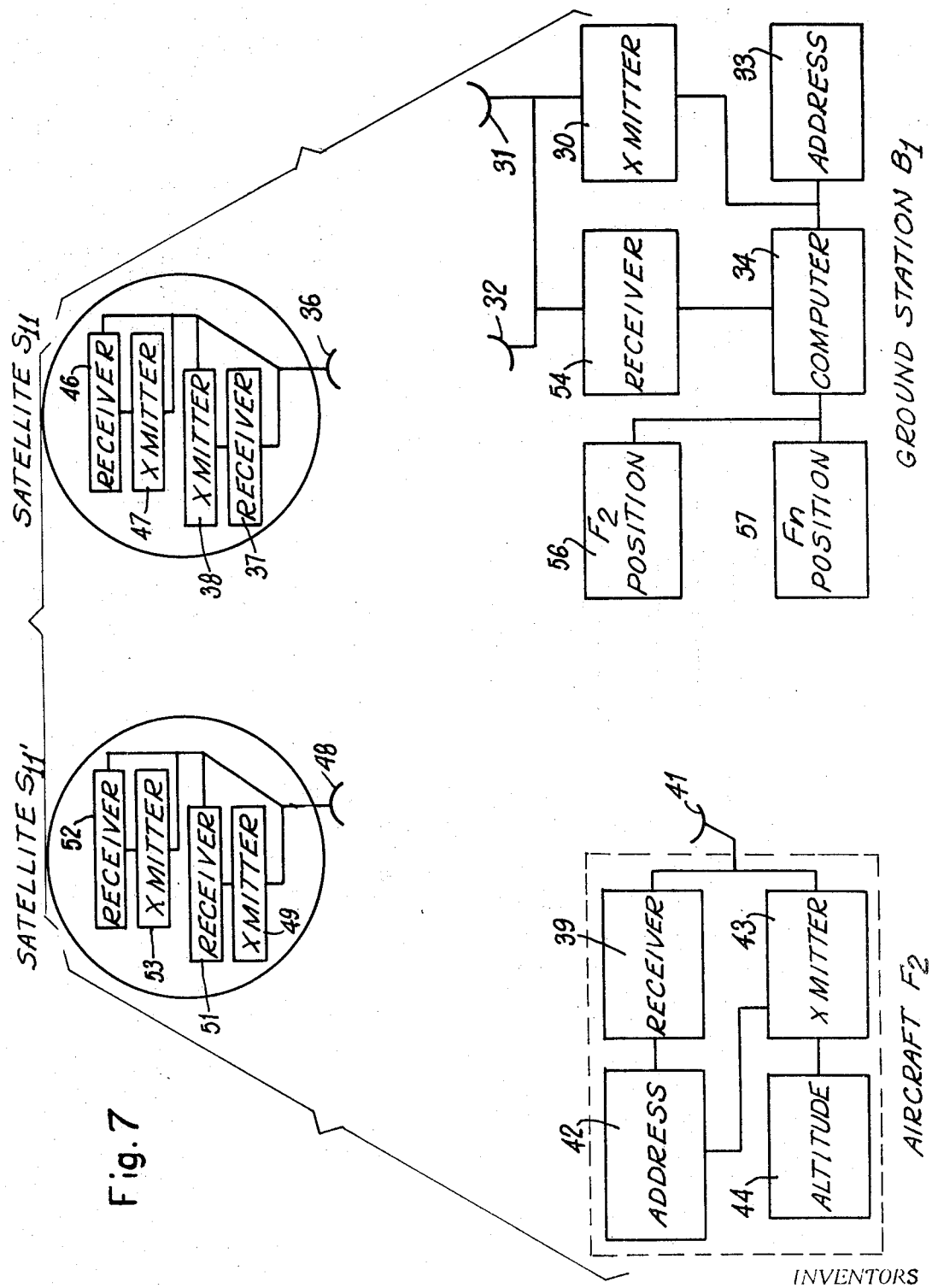

United States Patent Office 3,544,995
Patented Dec. 1, 1970

3,544,995
NAVIGATION METHOD WITH THE AID OF SATELLITES
Hans H. Bottenberg and Hans-Joachim Jestadt, Munich, Hans G. Leysieffer, Icking-Walchstadt, and Felix Johan Stockinger, Munich, Germany, assignors to Siemens Aktiengesellschaft, Berlin and Munich, Germany, a corporation of Germany
Filed July 15, 1968, Ser. No. 753,024
Claims priority, application Germany, July 21, 1967, 1,591,517, 1,591,518
Int. Cl. G01s 5/02, 5/12
U.S. Cl. 343—6                                       8 Claims

ABSTRACT OF THE DISCLOSURE

A method of navigating aircraft by the use of artificial earth satellites in which a plurality of aircraft or other craft such as ships may be accurately located for navigation purposes and to prevent collisions between the crafts. In one system aircrafts carry dead reckoning equipment and transmit identification and position to a ground station via a satellite and the ground station keeps a record of the positions of all craft. A second system and method comprises a ground station and more than one earth satellite which relay messages to aircraft upon interrogation by the ground station. The aircraft receives the messages from the satellite and retransmits them where they are detected at the ground station after passing through the satellites. A computer at the ground station calculates the position of the aircraft based on the transmittal time via the two satellites which position may then be transmitted back to the aircraft over a communication link, if desired. This system is modified, in the equatorial zone for example, to include satellite antennas having overlapping lobes for receiving the craft signals to allow the ground station to determine the geographic latitude of the craft.

BACKGROUND OF THE INVENTION

Field of the invention

The invention relates in general to navigation apparatus for aircraft and ships and particularly to methods for navigating using earth satellites.

Description of the prior art

As the airways and air space become more and more crowded the problem of maintaining safe spacing between aircraft so that collisions do not occur has become critical. It is also desirable for an aircraft to know its position at all times and particularly when other aircraft are in the area so that if a hazardous situation arises that might cause a collision, evasive maneuvers may be carried out.

SUMMARY OF THE INVENTION

The present invention relates to navigation systems and methods comprising a first method in which an aircraft that carries dead reckoning equipment transmits its dead reckoning position and identification to a ground station via an earth satellite. The ground station receives the message and keeps a record of the particular aircraft's position and also maintains position of other aircraft so as to observe the relative positions of the various crafts and to prevent a hazardous situation from arising. The aircrafts may also transmit altitude information via the satellite which is detected and noted at the ground station.

A second navigation method and system utilizes at least two earth satellites which might, for example, be orbit-stabilized synchron satellites. The ground station transmits addressed interrogation signals via the two satellites which are received by the satellites and retransmitted. These signals are received by aircraft and the particular aircraft identified by the address responds to the address and reradiates the singals received from both satellites and also transmits its altitude. Each of the satellites again receives the signal and reradiates it to the ground. The ground station detects the signals from the satellites and supplies the inputs to a computer which calculates the aircraft's position based on the transit time of the signals via the satellites to the particular craft.

In certain areas of the earth, for example, in the equatorial zone it is difficult to resolve the aircraft's position by noting the time differential between the signals traveling via the two satellites. A system for resolving this problem is disclosed which utilizes two antennas that have overlapping lobes which allows the ground station to determine the geographic latitude of the vehicle.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 illustrates a portion of the earth in perspective with satellites and ground stations usable in the methods of the present invention.

FIGS. 2a and 2b illustrate frequency spacing for various signals in the navigation systems of this invention.

FIG. 7 illustrates a second method of the navigation system according to this invention.

DESCRIPTION OF THE PREFERRED EMBODIMENTS

FIG. 1 illustrates a portion of the earth surface in oblique view which has ground tracking stations B1, B2 and B3 that may be mounted on different continents as for example, Europe and North America. Satellites S1, S11 and S11' are stabilized and synchronized in position in orbit (synchron satellites) above the surface of the earth. Aircraft F1, F2 and F3 of different positions and altitudes are illustrated flying at various positions over the earth's surface.

Figure 6:
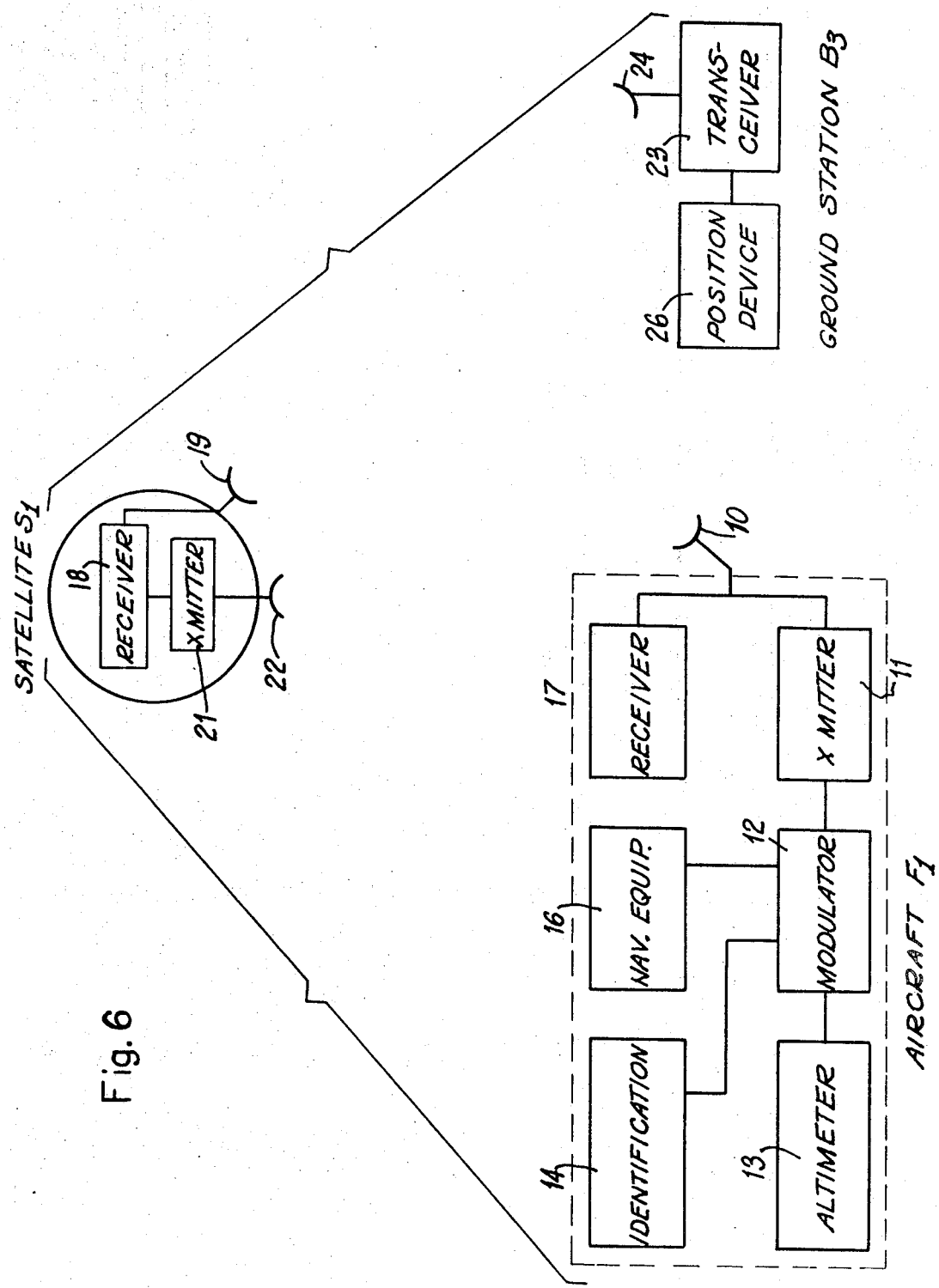
FIG. 6 is a block diagram of a first method of navigation by earth satellite.

A first navigation system by earth's satellite is utilized by the aircraft F1 in combination with the satellite S1 and the ground station B3. The aircraft F1 carries equipment on board for transmitting to the ground station B3 via the satellite S1 its position, and identification and its altitude. FIG. 6 for example, illustrates the aircraft F1 which has a siutable antenna 10 to which a transmitter 11 is connected. A modulator 12 is connected to the transmitter and receives inputs from an altimeter 13, an identifictaion circuit 14 and nav. equipment 16. The nav. equipment 16 may be dead reckoning equipment, celestial navigating equipment or any type of navigation equipment presently available. A receiver 17 is also connected to the antenna 10 for communication purposes with the ground station.

The carrier frequency of the transmiter 11 might be 1.6 gHz. for example, which is detected by a receiver 18 mounted in the satellite S1. The receiver 18 is connected to a suitable antenna 19. The receiver 18 detects the intelligence from the aircraft from the aircraft F1 and supplies it to a transmitter 21 which is in turn connected to antenna 22. The transmitter 21 converts the receive signal from the aircraft to a carrier frequency of 4 gHz., for example, and radiates it to a ground station B3.

The ground station B3 comprises a transceiver 23 which is connected to a suitable antenna 24. The output of the transceiver 23 is supplied to a navigation chart or other device 26 which indicates the position of the aircraft F1 to the observer at the ground station. The navigation device 26 also indicates all other aircraft whose position is being monitored so as to provide control and safety. For example, three hundred aircraft may be controlled with a total band width of 10 mHz. This comprises less than 10% of the 1.6 gHz. band. Thus, the major portion of the frequency band would be available for many long distance telephone calls or for channels of the second navigation system to be described hereafter. The aircraft F1 and the other aircraft transmit their position such as latitude, longitude and altitude. Air speed may also be transmitted by the aircraft. The total band width required is dependent upon the stability of the oscillators used and the maximum Doppler displacement possible. A quartz crystal oscillator may easily maintain a precision of $10^{-6}$ which corresponds to a frequency error of $\pm 1.6$ kc. with a 1.6 gHz. carrier. The Doppler displacement may be a few kc. with aircraft traveling up to three mach. With each aircraft assigned a channel of 25 kc. band width and with suitable spacing between channels only 10 mc. band width would be required for three hundred simultaneous channels. A binary frequency generator may control the stability of the transmitter 11 and the aircraft may be assigned a channel upon entering the navigation range. The modulator 12 may modulate onto the carrier the geographic longitude by utilizing 25 bits of information, the geographic latitude by using 25 bits of information and the altitude of the aircraft by using 10 bits of information.

If the position is transmitted from the aircraft once each second, a band width of 120 hertz is sufficient for the navigation channel.

The aircraft antenna may have a gain of 0 db. The satellite antenna should have at least a 17 db gain and the transmission over reasonable distances may occur when the output of the transmitter delivers 5 watts. Such transmitters may be produced with semi-conductors.

In the satellite S1 signals transmitted by the aircraft are converted in the receiver 18 to an intermediate frequency of 70 mc. and are amplified at that frequency and converted to the 4 gc. range. The transmitter 21 needs to radiate only a few milliwatts from the antenna 22. An automatic frequency control pilot tone may be transmitted from the ground station B3 to the satellite in the 1.6 gHz. band and said pilot tone may be used to stabilize the oscillator and control the 4 gc. transmitter.

The transceiver 23 in the ground station converts the 4 gHz. signal into a low frequency so that the individual message carriers may be easily separated and information from each aircraft obtained. It should be realized, of course, that many aircraft may utilize this navigation system I at the same time.

FIG. 1 also illustrates a second navigation system according to this invention.

In this system the aircraft's position is determined by retransmitting signals from a single ground station B1 to an aircraft F2 via a pair of satellites S11 and S11'. The aircraft carries a transponder which detects the signals radiated from the ground station via the two satellites and transmits a return signal which passes to the ground station through the two satellites. The aircraft answer includes a distance impulse and an additional impulse group which might contain altitude information among other items. The time of travel of the signals to and from the aircraft via the first and second satellites allows a computer at the ground station to calculate the position of the aircraft. The altitude of the aircraft is also fed into the computer and after the position is calculated by the computer it is fed back to the vehicle from the ground station via the satellite. Communication channels are also available to allow communication between the aircraft and ground station and vice versa.

A system according to this invention allows the supervision of air traffic over the North Atlantic, for example, a distance of about 600 miles from the equator with an absolute precision of 1 nautical mile for the position of the vehicle when the altitude of the vehicle above the ground is known with the precision of $\pm 50$ meters. For aircraft with radio altimeters a precision of better than $\pm 50$ meters is obtained and when using barometric altimeters greater errors may occur. However, if all aircraft are using barometric altimeters any altitude error will shift the computed position in the same direction which will substantially reduce the risk of collision. Thus, altitude errors of this nature will not be magnified by an atmospheric condition causing errors in barometric altitude.

Although in FIG. 1 the two satellites S11 and S11' are illustrated, it is to be realized, of course, that satellites may be strategically placed all about the earth and the aircraft may transfer from one set of satellites to another set as it travels along. For example, six equadistant synchron satellites around the equator allow coverage of all points of the surface of the earth up to geographic latitudes of $\pm 75°$.

The spacing of the measurement signals must be selected so that signals do not arrive at the ground station simultaneously from the two satellites and thus interfere with each other. The signal transmitted from the ground station to the satellites and to the vehicles comprising one measuring impulse and one code word in the form of an impulse group may have a length of about a hundred microseconds. The difference in operating time of all signals transmitted to and from the vehicle are below 50 milliseconds. The signals to the different vehicles could be arranged at intervals of 50 milliseconds from each other to prevent "garbling." Thus, for example, if six hundred vehicles are to be controlled simultaneously throughout the world with two satellites a total cycle time of one minute would be required. Each vehicle would receive navigation information once per minute. Therefore, it is better to arrange the vehicle addresses in the computer of the ground station according to their distances from the satellite. This does not increase the computation time by the computer because rearrangement of the storage is possible in a parallel computer should the movement of the craft render this necessary.

The total cycle time between the response impulses of the first and last aircraft can be chosen so that "garbling" between the response impulses does not occur. For example, considering the North Atlantic and assuming three hundred aircraft or other vehicles to be serviced by one pair of satellites as a maximum and selecting the interval between two subsequent measurement signals as 150 microseconds, a total time of 95 milliseconds will occur from the transmission of the first signal to the reception of the last response signal per satellite. The satellites may question aircraft at a distance equivalent to a 100 milliseconds, so that after 600 milliseconds all aircraft will have delivered their information to the ground station. Each reported aircraft can obtain a position report every 600 milliseconds assuming that the aircraft transponders are designed for this high rate of response and the computers are built for the evaluation of information at this rate.

Aircraft operating near the equator require an additional angular measurement such as described herein and the time between two subsequent navigation operations for one vehicle will increase to 60 seconds. However, this is adequate for navigation purposes.

For navigation less than 600 miles from the equator, the equator zone may be covered by an additional measurement by using a directional antenna with two overlaping lobes. The first null of the voltage in the two antennas will be obtained at a distance of about 600 miles of the transmitting aircraft from the equator when the antennas are 9 wave-lengths from each other. Thus, by using two lobing antennas, latitude near the equator can be determined with a precision of about 6 nautical miles. If satellites on polar orbits in synchronous altitudes are available in addition to the equatorial satellites, the two-lobe antenna system is not needed.

FIG. 7 illustrates the apparatus of the invention for a method utilizing two satellite. The ground state B1 has a transmitter 30 which is connected to a high gain selective antenna 31 which is directed at the satellite S11. The transmitter 30 is also connected to a second highly directive antenna 32 which is directed to the second satellite S11'. The transmitter 30 is connected to an address unit 33 which also supplies an input to a computer 34. The transmitter radiates a signal at 6 gHz. which is received at the satellite S11 and S11'. Satellite S11 has an antenna 36 which is connected to a receiver 37 that detects the 6 gHz. signal and converts to the VHF frequency range 118 and 136 mHz., for example, and supplies it to a transmitter 38. The transmitter 38 radiates the 118 to 136 mHz. signal to the aircraft F2. The aircraft F2 has a receiver 39 connected to an antenna 41 and supplies an output into the address unit 42. Each aircraft has a different address and if its received signal corresponds to the address of the particular aircraft receiving it, the address unit 42 will key the transmitter 43 in the aircraft to transmit signals back to the satellite in the VHF frequency range. An altitude indicator 44 may also be carried by the aircraft and this information may be fed back to the ground station through the satellite.

The satellite S11 receives the transponded signal from the aircraft F2 and detects it in a receiver 46. The receiver detects the VHF signal and supplies it to a transmitter 47 which is also connected to the antenna 36 and radiates back to the ground station B1 at 4 gHz., for example.

A second satellite S11' includes an antenna 48, a receiver 51 which detects the 6 gHz. signal from the ground station and converts it to a VHF signal and supplies it to a transmitter 49 which radiates a signal to the aircraft. The aircraft transponds the signal in the VHF frequency range and a receiver 52 detects this signal and supplies it to a transmitter 53 which radiates from the antenna 48 to the ground state B1 at a frequency of 4 gHz., for example.

A receiver 54 at the ground station is connected to the antennas 31 and 32 and supplies an input to the computer 34 which calculates and presents the position at an indicia 56 of the aircraft F2. Other aircraft positions are individually presented as indicated generally by indicator 57.

Since the satellites are position-stabilized, large antennas may be used at the ground stations which have high gain and may be as large at 25 meters in diameter or larger. The antenna gain of the satellites may be 17 db or greater. The aircraft antennas are omnidirectional. Although a frequency range of 118 to 136 mHz. has been given as an illustrative example of the frequency between the satellites and the aircraft, frequency of 1.54 to 1.36 gHz. is also available. To obtain precision a channel of 1 mHz. in width must be available.

For voice communication between aircraft and ground stations, 20 channels should be simultaneously available with low frequency range from 300 to 3 kHz. It should be realized, of course, that two possible ground stations within a single navigation range may be interconnected.

Since the satellites are fixed, the antennas 31 and 32 may be accurately focused on the satellites. The communication between the satellites and the aircraft presents a greater problem and the frequency range of 118 to 136 mHz. is used due to its lower directional atteuation. The frequency from 118 to 119 mHz. may be used as the message channel from the vehicle to the satellite and the frequency 120 to 121 mHz. as the navigation channel between the vehicle and the satellite. Frequency 133 to 134 mHz. may be used as the message channel between the satellite and the aircraft and 135 to 136 mHz. as the navigation channel between the satellite and the aircraft. These frequencies are illustrated in FIG. 2a. Since these frequencies are in the VHF aircraft navigation range, only 22% of the band would be accupied by the satellite system.

If desired, single side band modulation may be utilized for voice communication channels between passengers in the aircraft and the ground station. It has been found more expedient, however, to use frequency modulation which allows less transmitter power.

The navigation signals originate at the ground station B1 in the computer 34 which delivers consecutive pulse sequences with different addresses for the individual vehicles. Also if it is desired to establish communication with a particular one of the aircraft, this is also transmitted behind the address for that particular vehicle. Intellegence is placed into a pulse series which are stored in a modulator of the transmitter 30 and then converted to the 6 gHz. range as illustrated in FIG. 2b. FIG. 2b illustrates the converter or oscillator frequecny in the transmitter 30 as 01, the message channel is identified N1 and the navigation channel as R1. The transmitter output of a few watts is sufficient to establish communication to the satellite. Voice communications are established on the ground with 20 individual channels in the low frequency range of 300 to 3000 hertz. Each signal is used a phase modulate a carrier. The carriers have a mutual spacing of 50 hertz so like the navigation channel a total band width of 1 mHz. is used. A pilot tone is added to the phase modulated individual carrier multiplex signals at one of the ground stations to allow automatic frequency control in the satellite receiver. This composite signal is converted into steps to the 6 gHz. range so that a sufficiently large frequency spacing exists between the navigation and message channels for simple separation of both signals in an intermediate frequency stage of the receiver.

A few watts of power radiated by the transmitter at the ground station will provide adequate communication and navigation. The combined signals are radiated at the same time from the antennas 31 and 32. Several antennas for the 6 and 4 gHz. range are mounted on the satellites S11 and S11' and are directed toward a ground station. The receiver in the satellites detects the 6 gHz. signals and converts it to an intermediate frequency such that the navigation signal appears in the 135 to 136 mHz. range. The signal is then amplified and radiated with a peak output of less than 100 watts to the aircraft via the VHF antenna on the satellites.

The message band is separated by its intermediate frequency from the navigation band and converted to the 1 to 2 mHz. range. Regardless of the ground station from which the transmission originated, each channel carrier appears in the satellite in the 1 to 2 mHz. band with sufficient frequency precision. Interference will occur only when the same carrier is transmitted from two or more ground stations. This is avoided by command channel through which all of the ground stations are interconnected. For the command channel one of the twenty channels may be branched off in the satellite and connected directly to the trasmission portion of the satellite and radiated at 4 gHz. Additional data may also be exchanged between ground stations through this channel.

The remaining conversation signals are converted from the 1 to 2 mHz. position into the 133 to 134 mHz. position and amplified. The necessary peak output is about 100 watts if the receivers of the aircraft utilize center coupling.

Only one satellite is used to transmit the voice communication and the corresponding equipment in the second satellite is used for standby and can be controlled from the ground to turn it on or off.

On the aircraft the signals received in the band 135 to 136 mHz. for the navigation band 133 to 134 mHz. for the signal band are converted into the 3 to 4 mHz. range (navigation band) and into the 1 to 2 mHz. range (message band). A single channel frequency modulation receiver is connected to the message channel which can be tuned as desired and automatically to one of the remaining 19 channels.

The address unit 42 in the receiver recognizes a pulse address identifying the particular aircraft and the aircraft provides to the transmitter 43 altitude information from the altitude sensor 44 and any information indicating that voice communication with a particular ground station is desired. During the next cycle information for automatically setting the transmitter and receiver is removed from the logic for that channel when the ground station is ready to carry out voice communication. When all channels are busy a special pulse configuration exists.

When the pulse sequences are removed from the logic unit a carrier of 120.5 mHz. is modulated in a pulse modulator with a pulse output of approximately 300 watts.

A single channel transmitter which operates either optionally and automatically in accordance with instructions from the logic on one of the 19 channels in the 118 to 119 mHz. range (see FIG. 2a), is used to transmit voice communication messages. A signal of a quartz oscillator is modulated in phase and frequency and is multiplied to increase the phase variation. The transmission output may be about 10 watts.

The voice communication and navigation signals are combined and delivered to the antenna 41 for radiation.

In the satellites the VHF signals are converted in the same manner as in the aircraft into 1–2 mHz. and/or 3–4 mHz. and separated from each other. Navigation signals are modulated on the 4 gHz. carrier. The last converter may be a barometric transmission converter whose output side-band signal is transmitted. The frequency of the converted-oscillator is identified as 02, message channel is identified as N2 and the navigation channel is identified as R2.

In the 1 to 2 mHz. message band a signal used for direct traffic between the ground stations which has already been branched off from the 6 gHz. receiver of the satellite is transmitted directly to the ground stations. A multiplex signal is converted together with a frequency comparision pilot by way of an intermediate frequency carrier of 70 mHz. into the 4 gHz. range. Message signals are amplified and transmitted along with the navigation signal through a transmitter receiver switch.

Sufficient frequency spacing exists between the navigation and message signals to allow them to be easily separated at the ground stations.

The receiver in the ground station operates similarly to the 6 gHz. receiver in the satellite except that it operates in the 4 gHz. range and is fed by the two antennas 31 and 32. The navigation signal is demodulated from 135 to 136 mHz. and fed into the computer 34 to determine the transmittal time via the satellites S11 and S11' and other data. The message signal is converted with the 70 mHz. band into the 1–2 mHz. range and supplied to 20 frequency modulated signal channel receivers.

The computer 34 computes the position of the aircraft F2 and indicates it to an operator at the ground station and also transmits the aircraft's position via a communication channel back to the aircraft, if desired.

Aircraft near the equator require data on the geographic latitude of the craft.

To abrogate the difficulties of navigating vehicles near the equator a double antenna at the satellite with receiving sginals connected together according to the sum-difference principle and with radiation lobes which overlap partly in such a manner that the plane at which the difference voltages is equal to zero is used close to the equator. This difference voltage may be detected at the satellite and transmitted to the ground station to give an indication of the geographic latitude of the vehicle.

The elements of the double antenna are connected by way of a branching circuit so that the difference signal is proportional to the latitude of the vehicle, whereby the sign (plus or minus) shows whether the vehicle is northward or southward of the equator. This allows the vehicles latitude to be calculated.

Figure 3:
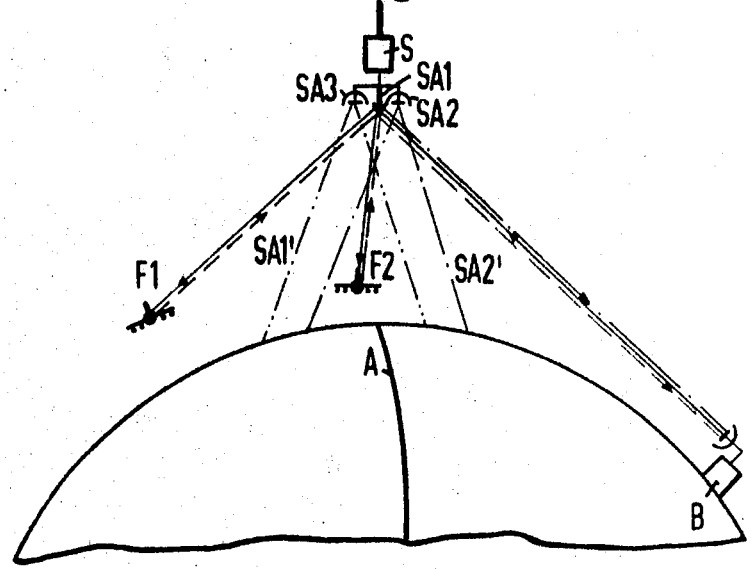
FIG. 3 is a perspective view of a cut-away portion of the earth illustrating how the latitude of the aircraft near the equator may be obtained.

FIG. 3 illustrates two aircrafts F1 and F2 which are located at different altitudes above the ground and at varying distances from the equator A. The questioning signals originating from a ground station B via a satellite S are furnished to the crafts F1 and F2. The satellite S has an antenna SA1 which has a broad radiation pattern for covering the entire visual area and extending far beyond the equatorial zone. Several such satellites may be distributed along the equator to assure adequate coverage. The radiation of this antenna is directed to the earth and in the case of an inquiry, the inquiry signal is transmitted from the ground station to the antenna SA1 whereafter amplification and frequency conversion reaches the aircraft F1, for example. The aircraft F1 recognizes the inquiry as being intended for it and energizes its transponder to return a corresponding signal. In the aircraft the response signal will contain intellegence indicating the altitude above ground as well as additional information when necessary (requests for voice communication, data speed indication, emergency signals and so forth). For surface vessels such as ships, altitude will, of course, not be indicated. The response signal returns via the satellite antenna SA1 to the ground station B. The time of transmittal from the ground station to the satellite to the craft and return will allow accurate position of the craft to be determined, if signals arrive from the same vehicle via at least two satellites. Highly directive antennas are utilized at the ground station to separate the signals from the two satellites.

Figure 4:
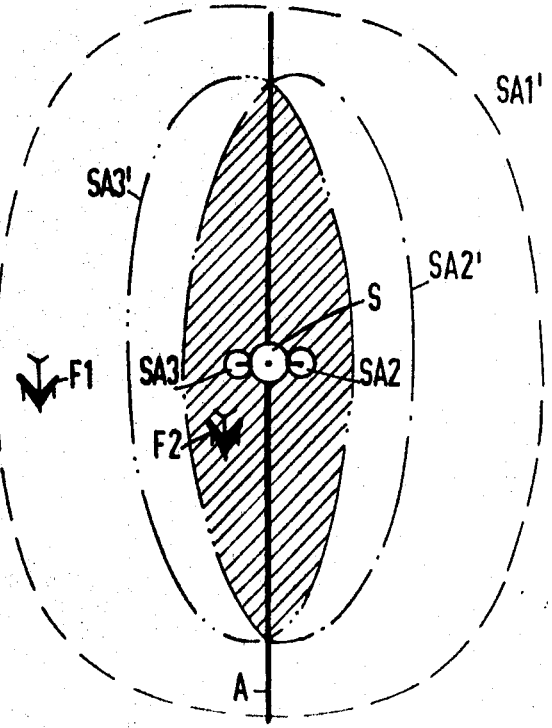
FIG. 4 is a plan view of the antenna pattern of the satellite of FIG. 3.

The aircraft F2 is near the equator A and for this reason double antennas SA2 and SA3 are mounted on the satellites which cover with their radiation lobes only the range of the equator so that both radiation lobes partly overlap. This is shown in FIG. 4 which illustrates the apparatus of FIG. 3 in a plan view wherein the principal radiation lobe of antenna SA2 is identified as SA2' and the principal radiation lobe of antenna SA3 is identified as SA3'. The field strength of the radiation lobes SA2' and SA3' are equal along the equator SA1' identifies the principal radiation lobe of the antenna SA1. The feedpoints of both antennas SA2 and SA3 are connected like monopulse antennas to a branching circuit at the output of which the sum and difference of the input voltages of both antennas SA2 and SA3 may be obtained. In the proximity of the equator the relationship of the voltages in the difference and sum channel is proportional to the geographic latitude of the craft. The sign of the signal indicates whether the aircraft is above or below the equator. The aircraft F2, for example, is more directly within the radiation range of antenna SA3 and less in the radiation range of antenna SA2, and the response signal transmitted from the transponder of the vehicle F2 will arrive stranger at antenna SA3 and weaker at antenna SA2. The difference signal USA2–USA3 will thus be negative and indicates that the aircraft is below the equator in the southern latitudes. On the other hand, if the vehicle F2 in FIGS. 3 and 4 were north of the equator, the difference USA2–USA3 would be positive which would indicate that the craft was north of the equator. This information obtained from the difference and sum of the two input voltages of the two input voltages of the antenna is transmitted to the ground station. This informaion may be coded onto the signal radiated by the aircraft to the ground station B. The communication of the aircraft F2's latitude then allows the ground station computer to calculate the position of the craft F2.

Figure 5:
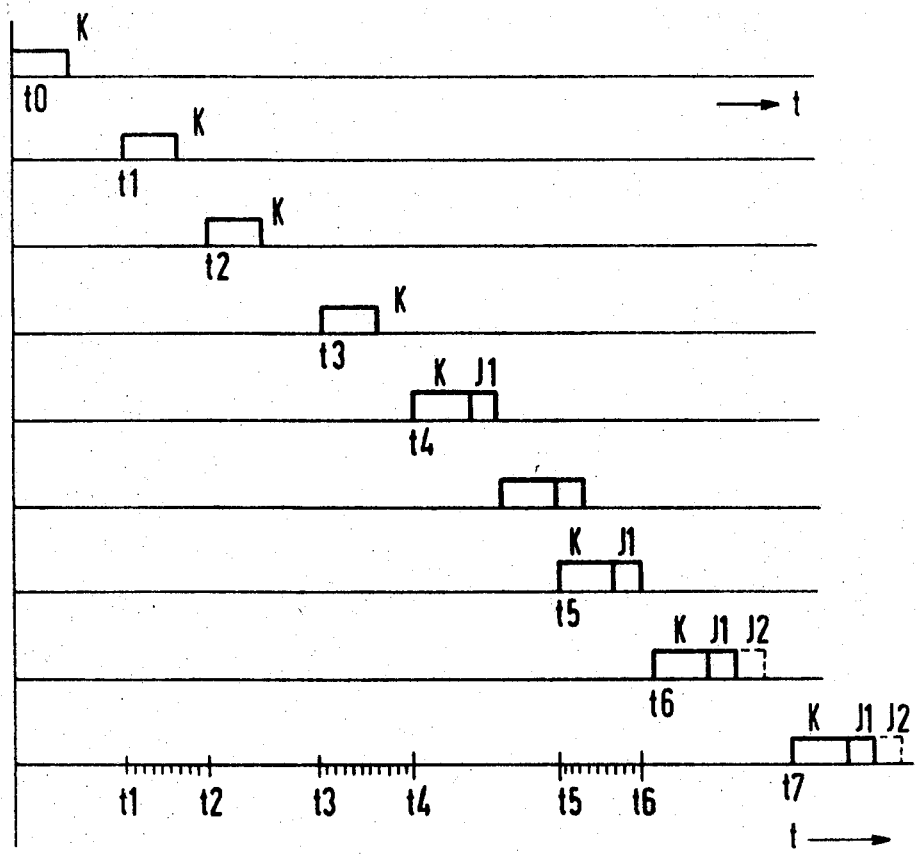
FIG. 5 illustrates the time sequence for inquiries from the ground station.

FIG. 5 illustrates the time schedule for inquiries from the ground station B. At the time $t0$ the signal K is transmitted from the ground station B. This signal contains an identification and arrives at the satellite S at time $t1$. It is therein amplified subjected to storage or frequency conversion and transmitted from the antenna at time $t2$. At time $t3$ the identification signal arrives at the craft which recognizes the identification and prepares a response in the transponder which is re-radiated at time $t4$ from the aircraft. This response contains, in addition to the identification, information J1 which indicates the speed, the altitude of the aircraft or similar messages. At time $t5$ the signal from the craft arrives at the antenna SA1 of the satellite S where it is stored until time $t6$, until the responsive signal received by antennas SA2 and SA3 is concluded. Additional information gained from the sum-difference information is identified with J2 and is radiated at the same time with response signal K+J1 at the time $t6$ by antenna SA1 of the satellite and arrives at time $t7$ at the ground station B where the evaluation is carried out. In total there will be dead times $t2-t1$, $t4-t3$ and $t6-t5$. These are determined by the particular navigation system involved and will be kept constant so that these additional times will be taken into consideration at the ground stations in measuring the operating time to calculate the craft's position.

Signals originating from vehicles outside the cross-hatch zone shown in FIG. 4 produce no J2 information. Signals relating to stabilization and position of the satellites are determined from craft whose positions are sufficiently far from the equator and thus sufficiently known.

It will be understood that variations and modifications may be effected without departing from the spirit and scope of the novel concepts of this invention.

We claim:

1. In a method for the navigation of vehicles by the measurement of signal transit time with the aid of at least one satellite which comprises transmitting a questioning signal from a ground station to the vehicle via the satellite, and transmitting a coded response to the questioning signal from the vehicle to the ground station via the satellite, the improvement which comprises receiving the response signal from said vehicle on the satellite by means of a double antenna, comparing the signals received by said antenna by the sum-difference principle, and transmitting the difference signal to the ground station as an indication of the latitude of said vehicle.

2. In the mehod of claim 1, comprising storing the coded response from the vehicle in the satellite until the distance of the vehicle from the equator has been computed and transmitting this distance signal in coded form with the coded response to the questioning signal from the vehicle to the ground station.

3. In a method according to claim 1, comprising radiating the questioning signal from the satellite from a special antenna independent of said double antenna.

4. In a method according to claim 1, comprising suppressing the response signal from said vehicle when said signals originate from vehicles located remote from the equator.

5. In a method according to claim 4, comprising maintaining the dead times or unguarded intervals occuring in transponders in said vehicles and in said statellites constant so that they may be taken into consideration in computing the transit times.

6. In a method according to claim 1, comprising permanently connecting said double antenna to the receiver.

7. In a method according to claim 1 comprising determining reference values for stabilization and position control by detecting signals from vehicles whose positions are remote from the equator.

8. In a method according to claim 1, comprising transmitting the quotient formed from the difference and sum signals from the satellite to the ground station.

References Cited

UNITED STATES PATENTS

| 3,384,891 | 5/1968 | Anderson | 343—100(SAT)X |
| 3,434,140 | 3/1969 | Chisholm | 343—112(TCux) |

RODNEY D. BENNETT, Primary Examiner

R. E. BERGER, Assistant Examiner

U.S. Cl. X.R.

343—15, 100, 112